(12) United States Patent
Feng et al.

(10) Patent No.: US 9,915,786 B2
(45) Date of Patent: Mar. 13, 2018

(54) TRANSMISSIVE PHOTONIC CRYSTAL FIBER RING RESONATOR EMPLOYING SINGLE OPTICAL BEAM-SPLITTER

(71) Applicant: BEIHANG UNIVERSITY, Beijing (CN)

(72) Inventors: Lishuang Feng, Beijing (CN); Junjie Wang, Beijing (CN); Yinzhou Zhi, Beijing (CN); Hongchen Jiao, Beijing (CN); Qiwei Wang, Beijing (CN); Wenshuai Song, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/313,103

(22) PCT Filed: Apr. 23, 2015

(86) PCT No.: PCT/CN2015/077293
§ 371 (c)(1),
(2) Date: Nov. 22, 2016

(87) PCT Pub. No.: WO2016/169023
PCT Pub. Date: Oct. 27, 2016

(65) Prior Publication Data
US 2018/0031769 A1 Feb. 1, 2018

(51) Int. Cl.
*G02B 6/32* (2006.01)
*G02B 6/26* (2006.01)
*G02B 27/30* (2006.01)

(52) U.S. Cl.
CPC ............... *G02B 6/32* (2013.01); *G02B 6/262* (2013.01); *G02B 27/30* (2013.01)

(58) Field of Classification Search
None
See application file for complete search history.

(56) References Cited

U.S. PATENT DOCUMENTS 4,273,445 A * 6/1981 Thompson ............ G01C 19/72
356/460
5,444,533 A 8/1995 Nishiura et al.
(Continued)

FOREIGN PATENT DOCUMENTS

CN 101294810 A 10/2008
CN 101387519 A 3/2009
(Continued)

*Primary Examiner* — Sung Pak
(74) *Attorney, Agent, or Firm* — Pai Patent & Trademark Law Firm; Chao-Chang David Pai

(57) ABSTRACT

A transmissive photonic crystal fiber ring resonator employing single optical beam-splitter comprises: a first fiber-optic collimator, a second fiber-optic collimator, a first photonic crystal fiber collimator, a second photonic crystal fiber collimator, an optical beam-splitter, and a fixture. The first fiber-optic collimator, the second fiber-optic collimator, the first photonic crystal fiber collimator, the second photonic crystal fiber collimator, and the optical beam-splitter are fixed on the fixture; the fiber pigtails of the first fiber-optic collimator and the second fiber-optic collimator are the input/output ports; the fiber pigtails of the first photonic crystal fiber collimator and the second photonic crystal fiber collimator are connected. The number of components of the photonic crystal fiber ring resonator is reduced by half: only one optical beam-splitter and two photonic crystal fiber collimators besides two fiber-optic collimators; therefore, the resonator structure can be simplified and the size can be reduced.

9 Claims, 1 Drawing Sheet

(56) References Cited

U.S. PATENT DOCUMENTS

| | | | | |
|---|---|---|---|---|
| 5,510,890 | A * | 4/1996 | Langdon | G01S 7/4818 356/28.5 |
| 9,506,759 | B2 * | 11/2016 | Yao | G01C 19/722 |
| 2003/0231824 | A1 * | 12/2003 | Yang | G02B 6/29349 385/27 |
| 2007/0201030 | A1 | 8/2007 | Sanders | |
| 2015/0071322 | A1 * | 3/2015 | Haensel | H01S 3/06791 372/107 |
| 2015/0285635 | A1 * | 10/2015 | Qiu | G01C 19/721 356/461 |
| 2016/0202063 | A1 * | 7/2016 | Yao | G01C 19/721 356/460 |

FOREIGN PATENT DOCUMENTS

| | | |
|---|---|---|
| EP | 1826531 A2 | 8/2007 |
| JP | 08233583 A | 9/1996 |
| JP | 0972826 A | 3/1997 |

\* cited by examiner

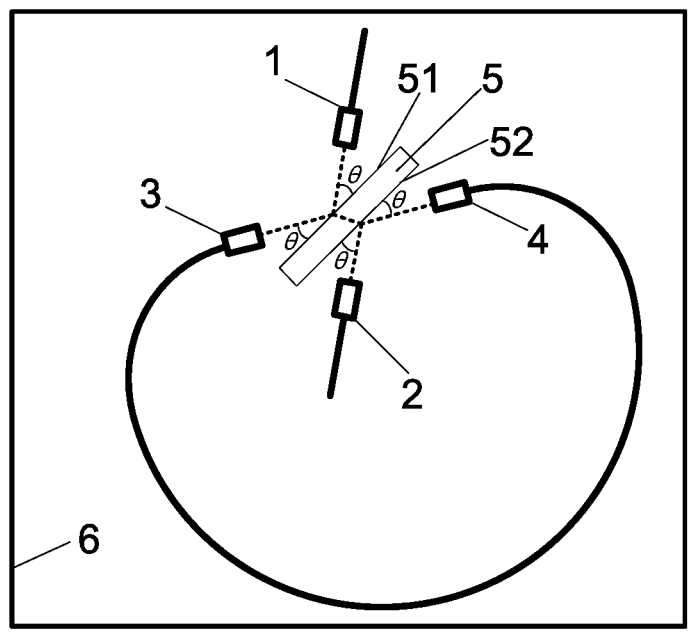

TRANSMISSIVE PHOTONIC CRYSTAL FIBER RING RESONATOR EMPLOYING SINGLE OPTICAL BEAM-SPLITTER

TECHNICAL FIELD

This patent involves a novel kind of optical ring resonator, which can be classified to the field of optical interference and optical sensing technology.

BACKGROUND OF THE INVENTION

Optical resonator is a research highlight of laser optics, optical sensing and etc. One of the key parameters of optical resonator is finesse or quality factor, which generally determines the ultimate performance of the system. As for the resonator optical gyro, the finesse of the passive ring resonator determines the fundamental limit of the system, and meanwhile the nonreciprocal error of a transmissive-type system is lower than that of a reflective-type system; therefore, a transmissive optical ring resonator with high-finesse is important for resonator optic gyro to reach high precision.

Photonic crystal fiber (PCF) has many excellent properties but, it is completely different from the traditional optical fibers, so do the fiber optic components such as fiber ring resonator. A variety of PCF ring resonator structures have been proposed. Developing a high-performance PCF ring resonator and applying it to the resonator optic gyro becomes a research highlight of inertial sensing in recent years.

The principle of ring resonator is multi-beam interference. For a transmissive ring resonator, the constructive interference among the light beams circulated in the resonator forms a series of interference peaks at the output port, so its transfer function can be regarded as discrete bright fringes in dark background. For a reflective ring resonator, the destructive interference between the incident light beam and the sum of the light beams circulated in the resonator forms a series of interference dips at the output port, so its transfer function can be regarded as discrete dark fringes in bright background.

Limited by the principle of wave guiding in photonic crystal fiber, the PCF ring resonator is generally assembled with individual components at present. A conventional transmissive PCF ring resonator consists of two optical beam-splitters, four fiber-optic collimators and four PCF collimators—so many components would lead to an increase of round-trip loss of resonator and difficulty of regulation, which was not good for increasing the finesse of resonator.

SUMMARY OF THE INVENTION

To offer a design of high-finesse transmissive PCF ring resonator structure, a transmissive photonic crystal fiber ring resonator employing single optical beam-splitter is provided. Due to the novel optical design, the said invention makes features of single optical beam-splitter, transmissive output, high finesse, small size and easy packaging.

A transmissive photonic crystal fiber ring resonator employing single optical beam-splitter, comprises: a first fiber-optic collimator, a second fiber-optic collimator, a first photonic crystal fiber collimator, a second photonic crystal fiber collimator, an optical beam-splitter, and a fixture.

The first fiber-optic collimator, the second fiber-optic collimator, the first photonic crystal fiber collimator, the second photonic crystal fiber collimator, and the optical beam-splitter are fixed on the fixture; the fiber pigtails of the first fiber-optic collimator and the second fiber-optic collimator are the input/output ports; the fiber pigtails of the first photonic crystal fiber collimator and the second photonic crystal fiber collimator are connected; the first fiber-optic collimator and the first photonic crystal fiber collimator are placed in the same side of the optical beam-splitter, and they are aligned according to the law of reflection of light; the second fiber-optic collimator and the second photonic crystal fiber collimator are placed in the other side of the optical beam-splitter, and they are also aligned according to the law of reflection of light; the first photonic crystal fiber collimator, the second photonic crystal fiber collimator, and the optical beam-splitter are aligned according to the law of refraction of light and the law of rectilinear propagation of light.

Compared to the conventional transmissive PCF ring resonator that employs two optical beam-splitters, four fiber-optic collimators and four PCF collimators, the said invention has the following advantages:

(1) The amount of components of the PCF ring resonator is halved: only one optical beam-splitter and two photonic crystal fiber collimators besides two fiber-optic collimators; therefore, the resonator structure can be simplified and the size can be reduced.

(2) The round-trip loss of the PCF ring resonator is effectively reduced because the amount of components of the PCF ring resonator is halved; consequently, the finesse of the PCF ring resonator is increased.

(3) The said two PCF collimators of the PCF ring resonator are aligned according to the law of refraction of light and the law of rectilinear propagation of light, but not the law of reflection of light. This change helps to ease the assembling of the invented PCF ring resonator and is good for monitoring on-line.

BRIEF DESCRIPTION OF THE DRAWINGS

FIG. 1 is a diagram illustrating the transmissive photonic crystal fiber ring resonator employing single optical beam-splitter of one embodiment of the present disclosure, wherein, 1—the first fiber-optic collimator
2—the second fiber-optic collimator
3—the first photonic crystal fiber collimator
4—the second photonic crystal fiber collimator
5—optical beam-splitter
51—the first beam-splitting interface
52—the second beam-splitting interface
6—fixture

DESCRIPTION OF THE PREFERRED EMBODIMENTS

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

A transmissive photonic crystal fiber ring resonator employing single optical beam-splitter, shown in FIG. 1, comprising: the first fiber-optic collimator 1, the second fiber-optic collimator 2, the first photonic crystal fiber collimator 3, the second photonic crystal fiber collimator 4, the optical beam-splitter 5, and the fixture 6;

The first fiber-optic collimator 1, the second fiber-optic collimator 2, the first photonic crystal fiber collimator 3, the second photonic crystal fiber collimator 4, and the optical beam-splitter 5 are fixed on the fixture 6;

The first fiber-optic collimator 1 and the second fiber-optic collimator 2 are both conventional fiber-optic collimators, each of which comprises a conventional optical fiber and a collimator lens group;

The said conventional optical fiber refers to the kind of optical fiber whose core-index is higher than the cladding-index and, meanwhile, whose way of lightwave guiding is based on the principle of total internal reflection.

The first photonic crystal fiber collimator 3 and the second photonic crystal fiber collimator 4 are both photonic crystal fiber collimators, each of which comprises a photonic crystal fiber and a collimator lens group.

The said photonic crystal fiber refers to the kind of optical fiber whose cross-section has periodic micro-structures, including but not limited to hollow-core optical fiber and solid-core optical fiber;

The pigtail of the first fiber-optic collimator 1 is an input/output port, and the pigtail of the second fiber-optic collimator 2 is also an input/output port;

The pigtails of the first photonic crystal fiber collimator 3 and the second photonic crystal fiber collimator 4 are connected;

The optical beam-splitter 5 is an optical dielectric flat. The first beam-splitting interface 51 and the second beam-splitting interface 52 can be coated or uncoated;

The fixture 6 is made of crystallized glass, quartz, invar or other low-thermal-expansion materials so that the temperature-induced changes of the relative positions of the first fiber-optic collimator 1, the second fiber-optic collimator 2, the first photonic crystal fiber collimator 3, the second photonic crystal fiber collimator 4 and the optical beam-splitter 5 can be controlled below the designed value in the operating temperature range. The fixture 6 can be any shape.

The first fiber-optic collimator 1 and the first photonic crystal fiber collimator 3 are placed in the same side of the optical beam-splitter 5, and they are aligned according to the law of reflection of light; the second fiber-optic collimator 2 and the second photonic crystal fiber collimator 4 are placed in the other side of the optical beam-splitter 5, and they are also aligned according to the law of reflection of light; the first photonic crystal fiber collimator 3, the second photonic crystal fiber collimator 4, and the optical beam-splitter 5 are aligned according to the law of refraction of light and the law of rectilinear propagation of light.

The said collimator lens group refers to the kind of optical element that comprises one lens or more and can collimate or collect light beam;

The angles between the optical beam-splitter 5 and the working axes of the first fiber-optic collimator 1, the second fiber-optic collimator 2, the first photonic crystal fiber collimator 3 and the second photonic crystal fiber collimator 4 are equal, which can be represented by θ (0°<θ<90°). Especially, θ is recommended to be the complementary angle of the Brewster angle;

As shown in FIG. 1, the dashed lines represent the light paths. The input light enters the pigtail of the first fiber-optic collimator 1, and then reaches the first beam-splitting interface 51 of the optical beam-splitter 5 after collimated by the first fiber-optic collimator 1. When passing through the first beam-splitting interface 51, part of the collimated light beam is reflected into the first photonic crystal fiber collimator 3. The pigtails of the first photonic crystal fiber collimator 3 and the second photonic crystal fiber collimator 4 are connected. The light goes out from the second photonic crystal fiber collimator 4 and becomes a collimated light beam. When passing through the second beam-splitting interface 52, part of the collimated light beam is reflected into the second fiber-optic collimator 2 and then exit from the pigtail of the second fiber-optic collimator 2; meanwhile, the remaining part of the collimated light beam passes through the first beam-splitting interface 51 and the second beam-splitting interface 52 of the optical beam-splitter 5, and then reenter the first photonic crystal fiber collimator 3. The process repeats again and again. The first photonic crystal fiber collimator 3, the second photonic crystal fiber collimator 4 and the optical beam-splitter 5 form a closed loop. Every cycle the light propagates along the loop, part of the light will exit from the pigtail of the second fiber-optic collimator 2 after reflected by the second beam-splitting interface 52 and collected by the second fiber-optic collimator 2. These light beams are coherent. Resonance peaks would be generated if the frequency of the light beams matched the resonance frequency of the ring resonator. Resonance peaks can be also generated at the pigtail of the first fiber-optic collimator 1, provided that the light enters the system from the pigtail of the second fiber-optic collimator 2 and passes through the reciprocal light path.

Unlike the conventional reflective resonator employing single optical beam-splitter or the transmissive resonator employing dual optical beam-splitters, the present invention proposes a kind of special optical structure, which makes it possible that a resonator employing single optical beam-splitter 5 can exhibit characteristics of transmissive resonance peaks. The embodiment of the present disclosure possesses, therefore, advantages of single optical beam-splitter, transmissive output, high finesse, small size and easy packaging.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A transmissive photonic crystal fiber ring resonator employing single optical beam-splitter, comprising: a first fiber-optic collimator, a second fiber-optic collimator, a first photonic crystal fiber collimator, a second photonic crystal fiber collimator, an optical beam-splitter, and a fixture, wherein the first fiber-optic collimator, the second fiber-optic collimator, the first photonic crystal fiber collimator, the second photonic crystal fiber collimator, and the optical beam-splitter are fixed on the fixture; fiber pigtails of the first fiber-optic collimator and the second fiber-optic collimator are the input/output ports; fiber pigtails of the first photonic crystal fiber collimator and the second photonic crystal fiber collimator are connected to each other; the first fiber-optic collimator and the first photonic crystal fiber collimator are placed at one side of the optical beam-splitter, and they are aligned according to the law of reflection of light; the second fiber-optic collimator and the second photonic crystal fiber collimator are placed at another side of the optical beam-splitter, and they are also aligned according to the law of reflection of light; the first photonic crystal fiber collimator, the second photonic crystal fiber collimator, and the optical beam-splitter are aligned according to the law of refraction of light and the law of rectilinear propagation of light.

2. The transmissive photonic crystal fiber ring resonator of claim 1, wherein the said first fiber-optic collimator and the second fiber-optic collimator are both conventional fiber-optic collimators, each of which comprises a conventional optical fiber and a collimator lens group.

3. The transmissive photonic crystal fiber ring resonator of claim 2, wherein the said conventional optical fiber refers to the kind of optical fiber whose core-index is higher than the cladding-index and whose way of lightwave guiding is based on the principle of total internal reflection.

4. The transmissive photonic crystal fiber ring resonator of claim 2, wherein the said first photonic crystal fiber collimator and the second photonic crystal fiber collimator are both photonic crystal fiber collimators, each of which comprises a photonic crystal fiber and a collimator lens group.

5. The transmissive photonic crystal fiber ring resonator of claim 4, wherein the said photonic crystal fiber refers to the kind of optical fiber whose cross-section has periodic micro-structures.

6. The transmissive photonic crystal fiber ring resonator of claim 2, wherein the said collimator lens group refers to the kind of optical element that comprises one lens or more and can collimate or collect light beam.

7. The transmissive photonic crystal fiber ring resonator of claim 1, wherein the said optical beam-splitter is an optical dielectric plate, whose two interfaces are coated or uncoated.

8. The transmissive photonic crystal fiber ring resonator of claim 1, wherein the angles between the said optical beam-splitter and the working axes of the first fiber-optic collimator, the second fiber-optic collimator, the first photonic crystal fiber collimator and the second photonic crystal fiber collimator are equal, which is represented by $\theta$ ($0°<\theta<90°$).

9. The transmissive photonic crystal fiber ring resonator of claim 4, wherein the said collimator lens group refers to the kind of optical element that comprises one lens or more and can collimate or collect light beam.

\* \* \* \* \*